(12) United States Patent
Quail et al.

(10) Patent No.: US 12,418,224 B2
(45) Date of Patent: Sep. 16, 2025

(54) SYSTEM AND METHOD FOR SELECTIVE ACTIVATION AND DEACTIVATION OF ELECTRICAL BRUSHES USED IN A DYNAMOELECTRIC MACHINE FOR CURRENT DENSITY OPTIMIZATION

(71) Applicant: GE Infrastructure Technology LLC, Greenville, SC (US)

(72) Inventors: Paul August Quail, Balston Lake, NY (US); Jason Salvatore Disanto, Dunwoody, GA (US); Eric Steven Buskirk, Scotia, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 237 days.

(21) Appl. No.: 18/493,906

(22) Filed: Oct. 25, 2023

(65) Prior Publication Data

US 2025/0141322 A1    May 1, 2025

(51) Int. Cl.
*H02K 13/14* (2006.01)

(52) U.S. Cl.
CPC .................................. *H02K 13/14* (2013.01)

(58) Field of Classification Search
CPC .... H02K 13/14; H02K 11/27; H02K 2213/09; H02K 5/141; H02K 19/26; H02K 13/003; H02K 11/20; H02K 13/10; H02K 11/04; H02K 19/36; H01R 39/24; H01R 39/08;
(Continued)

(56) References Cited

U.S. PATENT DOCUMENTS

| 1,488,573 | A | 4/1924 | Wagner |
| 5,744,890 | A * | 4/1998 | Yamaguchi ............ H02K 23/20 |
| | | | 310/248 |
| 8,972,219 | B2 | 3/2015 | Schieke et al. |

(Continued)

FOREIGN PATENT DOCUMENTS

| DE | 2918524 A1 | 11/1979 |
| DE | 202020101256 U1 | 3/2020 |

(Continued)

OTHER PUBLICATIONS

Author: Shobert, Erle I, Title: Book, Carbon Brushes The Physics and Chemistry of Sliding Contact, presented by Stackpole Carbon Company, Date: Unknown, pp. 164-167, Published: USA.

(Continued)

*Primary Examiner* — Tulsidas C Patel
*Assistant Examiner* — Mohammed Ahmed Qureshi
(74) *Attorney, Agent, or Firm* — Grogan, Tuccillo & Vanderleeden LLP

(57) ABSTRACT

A system and method for selective activation and deactivation of electrical brushes used in a dynamoelectric machine for current density optimization is disclosed. The approach includes using an arrangement of switches electrically connected to the electrical brushes to selectively activate and deactivate the brushes during the operation of the dynamoelectric machine. This entails opening and closing selective ones of the switches for a predetermined time period to adjust the average current density of the electrical current passing through the electrical brushes to be within a predetermined current density range while the dynamoelectric machine is operating.

20 Claims, 9 Drawing Sheets

(58) Field of Classification Search
CPC ....... G01R 19/08; G01R 31/343; H02P 25/12; H02P 9/16; Y10S 388/928
See application file for complete search history.

(56) References Cited

U.S. PATENT DOCUMENTS 9,793,670 B2   10/2017   Steinbach et al.
10,658,806 B2    5/2020   Scalzo, III et al.

FOREIGN PATENT DOCUMENTS

JP       362268337 A     11/1987
JP       S62268337 A  * 11/1987

OTHER PUBLICATIONS

Corresponding European Application No. HP 24 20 3721; European Search Report dated Feb. 24, 2025.

* cited by examiner

SYSTEM AND METHOD FOR SELECTIVE ACTIVATION AND DEACTIVATION OF ELECTRICAL BRUSHES USED IN A DYNAMOELECTRIC MACHINE FOR CURRENT DENSITY OPTIMIZATION

CROSS REFERENCE TO RELATED APPLICATIONS

The present patent application is related to concurrently filed, co-pending, and commonly assigned U.S. patent application Ser. No. 18/493,929, entitled "SYSTEM AND METHOD FOR CONTROLLING CURRENT DISTRIBUTION TO ELECTRICAL BRUSHES USED IN DYNAMOELECTRIC MACHINE", the disclosure of which is incorporated herein by reference.

BACKGROUND

Technical Field

Embodiments of this disclosure relate generally to dynamoelectric machines, and more specifically, to deploying an arrangement of a switches in electrical connection with electrical brushes that are maintained on a surface of a collector ring placed on a rotating shaft of a dynamoelectric machine that pass current between an external source and the dynamoelectric machine, and selectively activating and deactivating the brushes during the operation of the dynamoelectric machine via the switches for a predetermined time period to adjust an average current density of the current passing through the brushes to be within a predetermined current density range.

Discussion of Art

A dynamoelectric machine, such as for example, an electrical generator, includes a rotor body that can be made of a ferrous metal material that is rotatably mounted on a shaft via a bearing assembly. Arranged circumferentially about the mid-section of the rotor body are a multiple of axially oriented slots extending radially outward from a center of the rotor body that hold a multiple of field windings of coils that can be made of copper or aluminum. These field windings of coils can include longitudinally oriented central windings secured with the slots, and turns of endwindings extending out from the slots at axial ends of the rotor body. The shaft of the electrical generator can include a driven end having a coupling for a prime mover, such as for example a gas turbine or a steam turbine, that is operative to turn the shaft. The turning of the shaft by the prime mover produces a rotating magnetic field within the machine. This induces a three-phase set of voltages with stator windings in a stator of the electrical generator that encloses the rotor body. The opposing end of the shaft, which can be referred to as the non-driven end, includes collector rings mounted on or attached to the shaft that rotate with shaft as the shaft rotates. Stationary electrical brushes are typically spring loaded to be maintained continuously on a surface of the collector rings as the rings rotate with the shaft. Electrical current from an external source can be supplied to the collector rings via the electrical brushes. The electrical current passes from the collector rings internally through the shaft to the field windings of coils in the rotor body. In this manner, the electrical current that passes from the electrical brushes to the collector rings to the field windings of coils can maintain the rotating electromagnetic field at a fixed polarity.

Electrical brushes have an optimal current level to ensure the proper film development between the brushes and the collector rings (which is essential to maintaining brush life and minimizing variability of the contact resistance). A high variable contact resistance leads to some of the electrical brushes having almost zero current, while other brushes will receive two to three times the average current value. This uneven distribution of the electrical current between the electrical brushes, that is often referred to as selectivity, can lead to brushes overheating, and exacerbate the poor film development between the brushes and the collector rings. These conditions can eventually lead to a flashover that can result in significant arc damage and melted parts, creating a safety risk to nearby operators. Power plants continue to increase turndown which necessitates the plants to operate over a large range of field currents that is typically outside of the range of the brushes' current density requirements. Accordingly, there is a need to address this issue so that the electrical brushes can operate within their optimal current density range requirements.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

The solution provided by the various embodiments that obviates the aforementioned selectivity issues entails providing an arrangement of switches in the electrical circuit of the electrical brushes to activate or deactivate either a single brush or a group of brushes at a time in order to adjust the average current density of the active brushes to be within a specific current density while the dynamoelectric machine is operating. In this manner, by attaining a specific current density via the arrangement of switches, the various embodiments enable the film development between the electrical brushes and the collector rings, so that there is a better chance of evenly distributing the current among the brushes despite their inherent resistance variability that makes this difficult. In addition to using the arrangement of switches, an embodiment can include an arrangement of balance resistor devices that can be selectively coupled with the switches and the brushes to remove resistance variability in the electrical path between these components, thereby ensuring that there is an equal distribution of the current that passes through certain brushes.

In accordance with one embodiment, a system is provided. The system comprises: a collector ring placed on a rotating shaft of a dynamoelectric machine; a plurality of electrical brushes maintained on a surface of the collector ring as the collector ring rotates with the rotating shaft, wherein the plurality of electrical brushes are configured to pass electrical current between an external source and the dynamoelectric machine via the collector ring; and an arrangement of a plurality of switches electrically connected to the plurality of electrical brushes to selectively activate and deactivate the plurality of electrical brushes during the operation of the dynamoelectric machine, wherein selective ones of the plurality of switches are opened and closed for a predetermined time period to adjust the average current density of the electrical current passing through the electrical brushes to be within a predetermined current density range while the dynamoelectric machine is operating.

In accordance with another embodiment, a dynamoelectric machine is provided. The dynamoelectric machine comprises: a rotatable shaft; a rotor body mounted on the rotatable shaft, the rotor body having a plurality of field windings of coils secured thereabout; at least one collector ring placed on an end of the rotatable shaft; a plurality of electrical brushes maintained on a surface of the at least one collector ring as the at least one collector ring rotates with the rotatable shaft, wherein the plurality of electrical brushes are configured to pass electrical current between an external source and the field windings of coils secured to the rotor body via the at least one collector ring; and an arrangement of a plurality of switches electrically connected to the plurality of electrical brushes to selectively activate and deactivate the plurality of electrical brushes during the rotation of the rotor body, wherein selective ones of the plurality of switches are opened and closed for a predetermined time period to adjust an average current density of the electrical current passing through the electrical brushes to be within a predetermined current density range while the rotor body is rotating.

In accordance with yet another embodiment, a method for optimizing current density to a plurality of brushes maintained on a surface of a collector ring placed on a rotating shaft of a dynamoelectric machine that pass current between an external source and the dynamoelectric machine is provided. The method comprises: arranging a plurality of switches in electrical connection with the plurality of electrical brushes; and selectively activating and deactivating the plurality of electrical brushes during the operation of the dynamoelectric machine via the plurality of switches, wherein selective ones of the plurality of switches are opened and closed for a predetermined time period to adjust an average current density of the electrical current passing through the electrical brushes to be within a predetermined current density range while the dynamoelectric machine is operating.

DRAWINGS

The present invention will be better understood from reading the following description of non-limiting embodiments, with reference to the attached drawings, wherein below:

Figure 1:
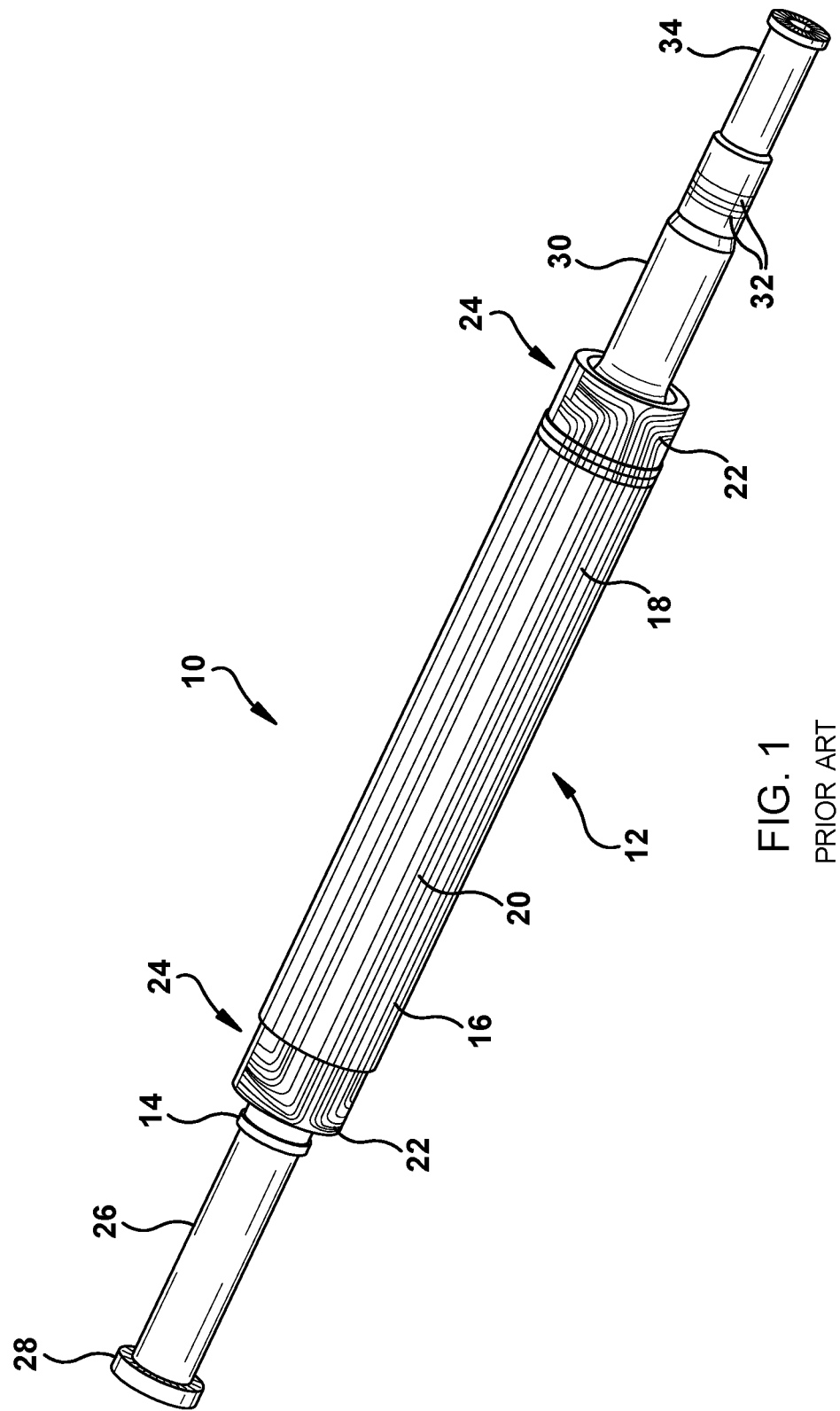
FIG. 1 shows an isometric view of a dynamoelectric machine such as an electrical generator according to the prior art.
Figure 2:
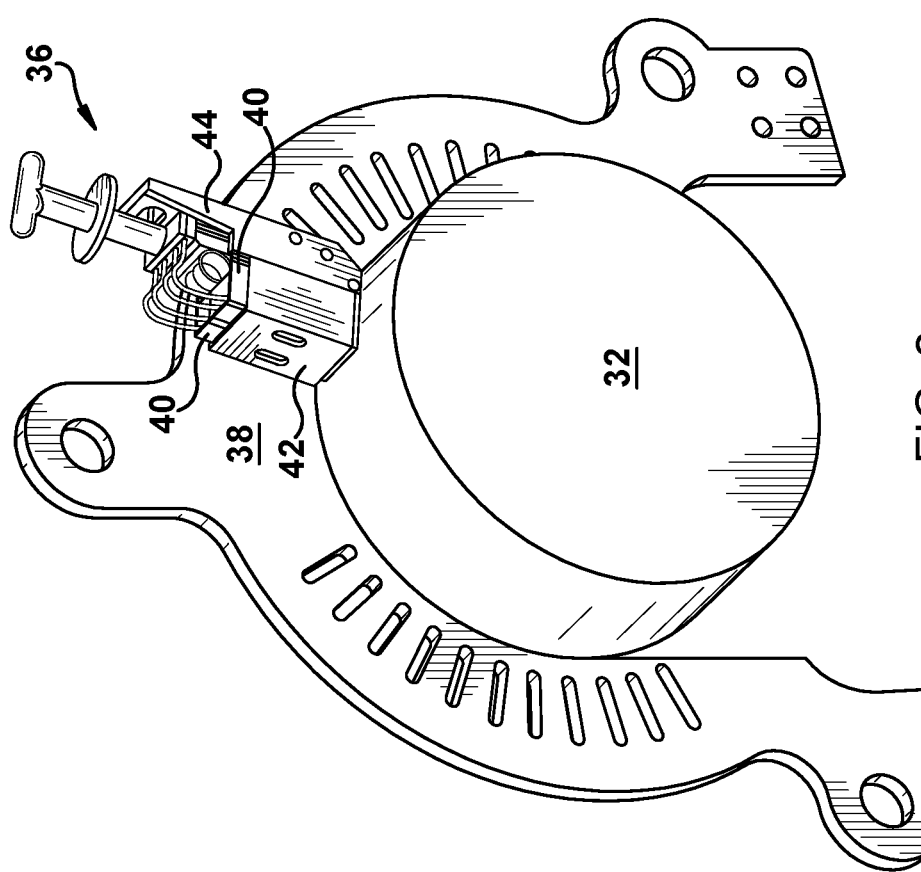
FIG. 2 illustrates a partial perspective view of a single brush holder rigging assembly installed on a brush mount or a collector horseshoe installed on a collector ring of an electrical generator like that depicted in FIG. 1 according to the prior art.
Figure 3:
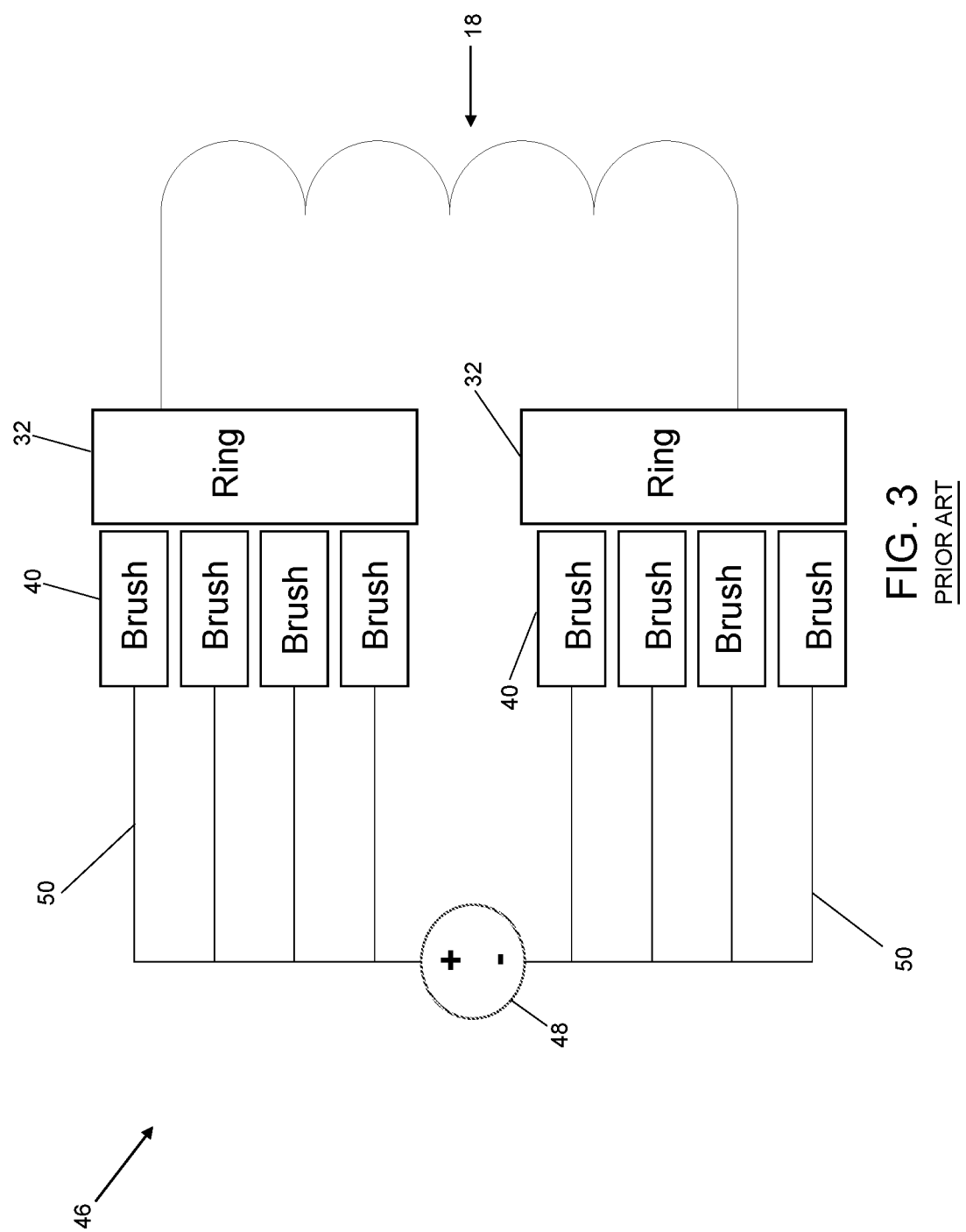
Figure 4:
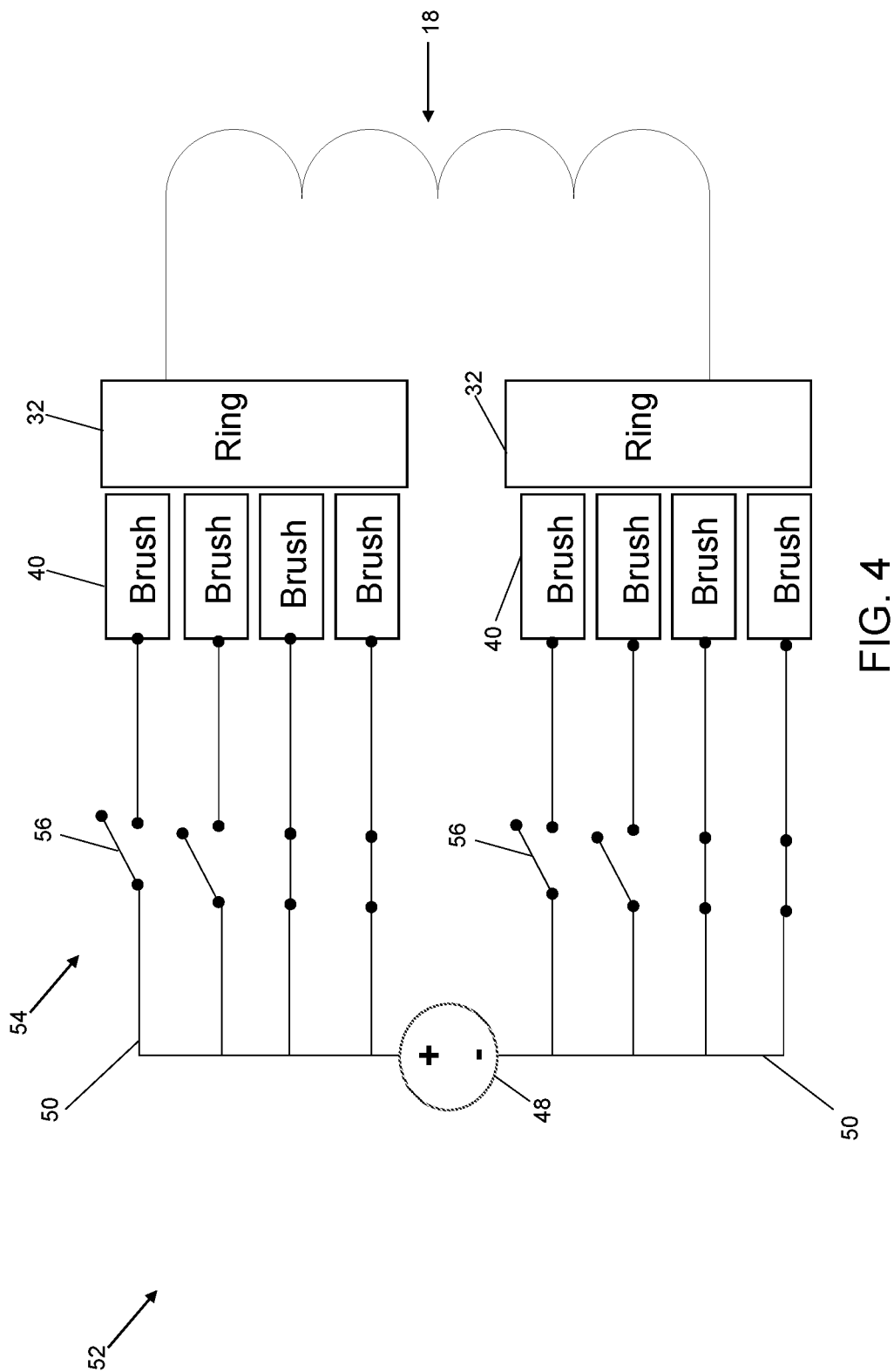
Figure 5:
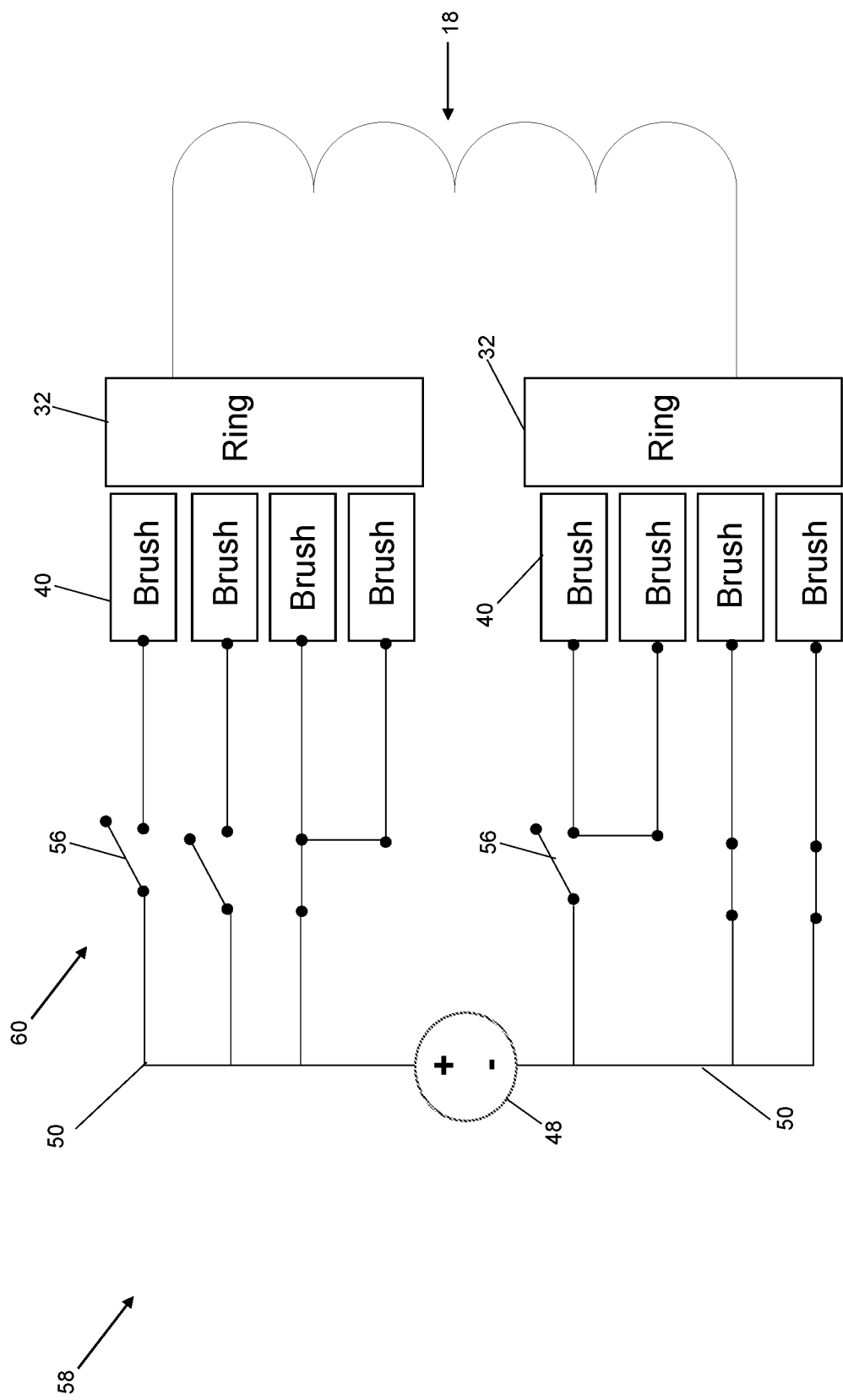
Figure 6:
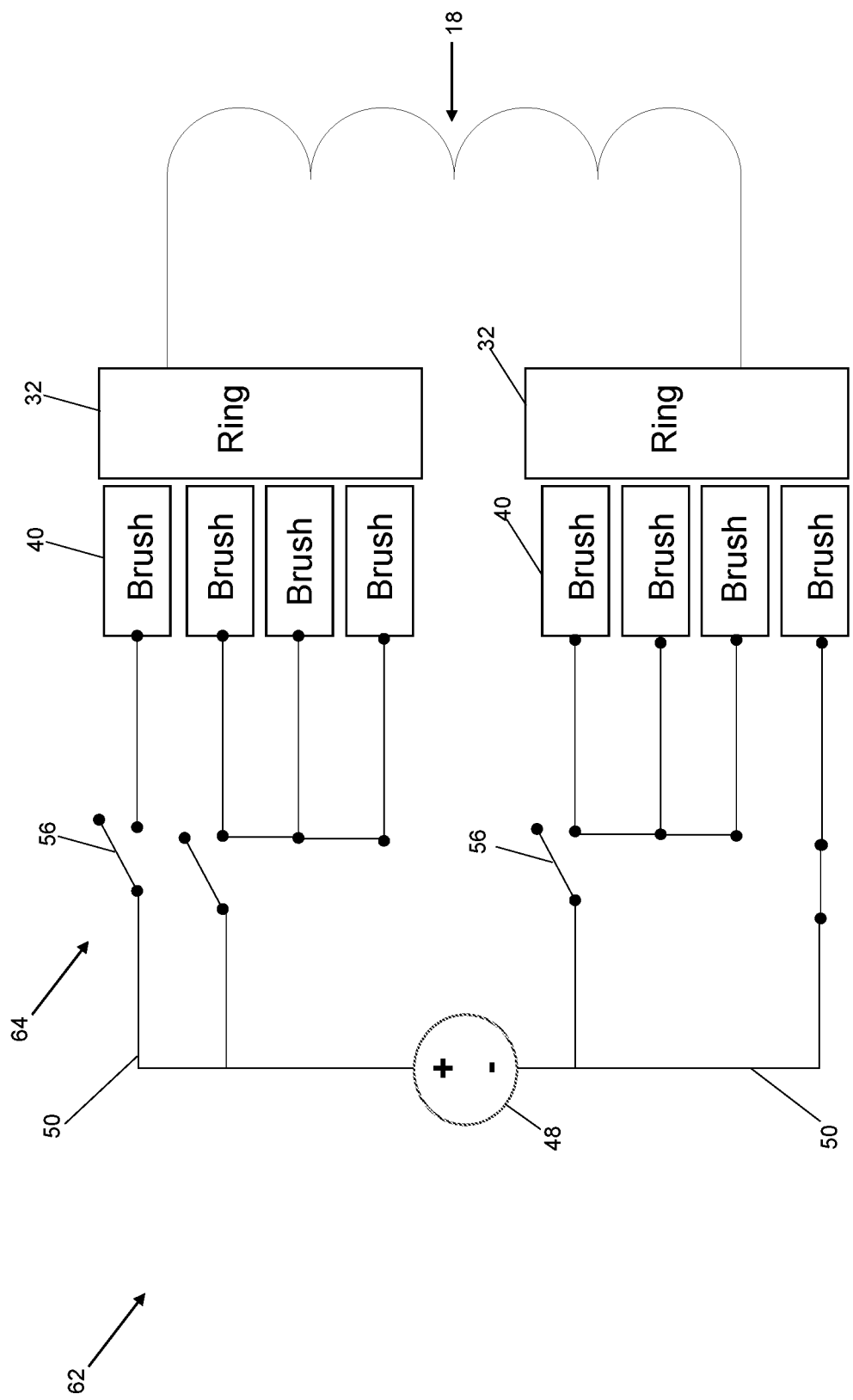
Figure 7:
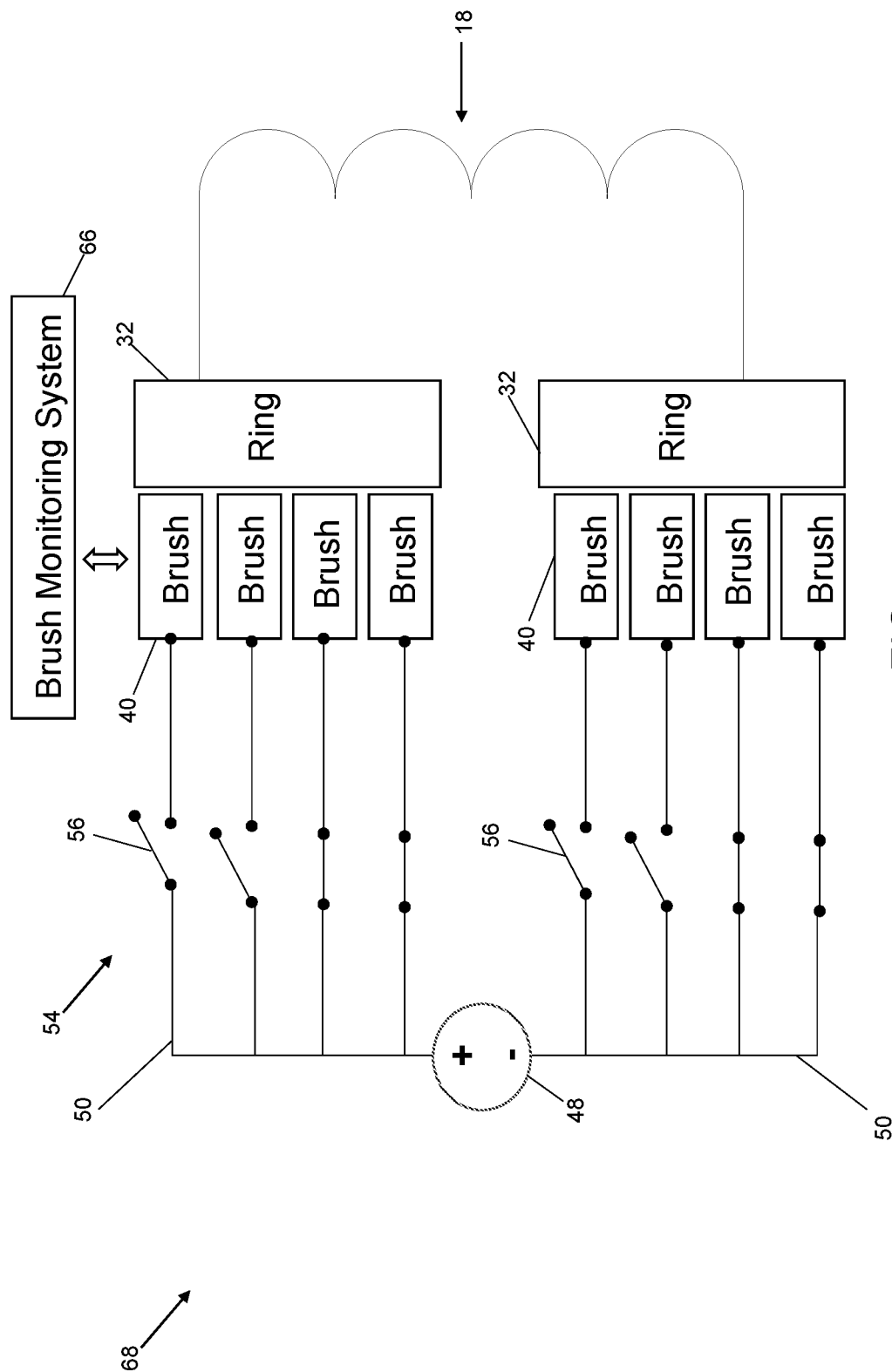
Figure 8:
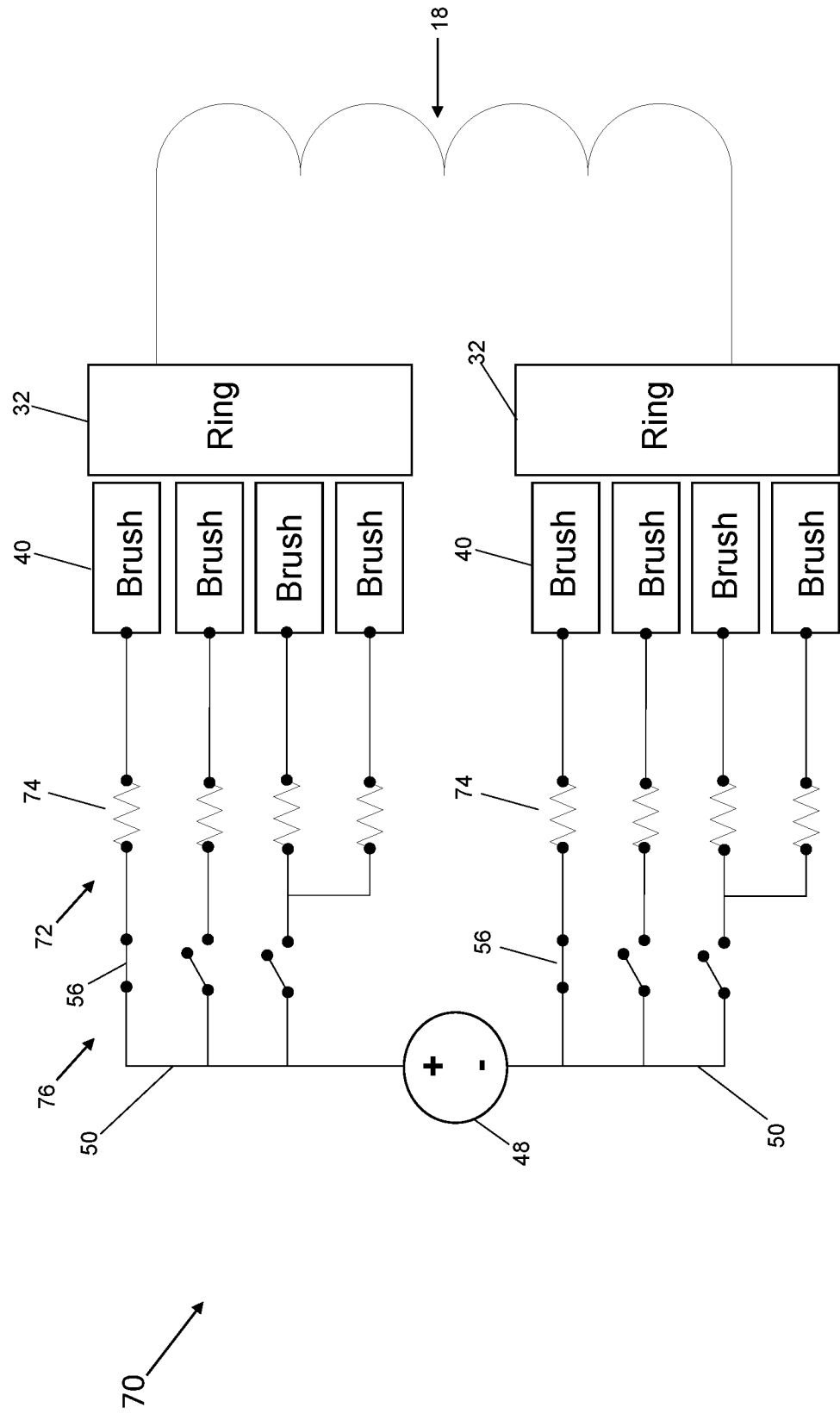
Figure 9:
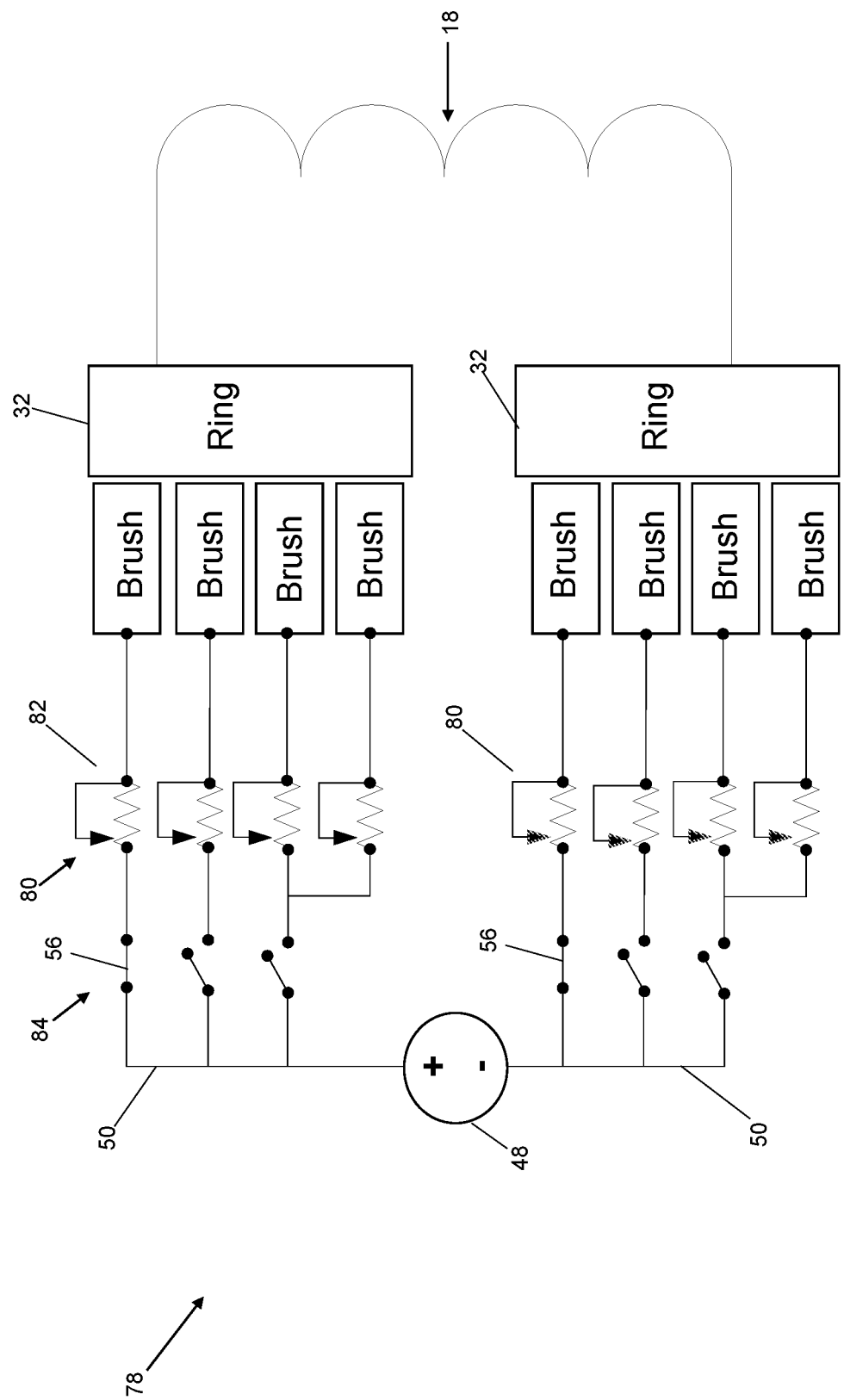

FIG. 3 shows a schematic representation of an electrical circuit illustrating the passing of an electrical current between an external source and multiple field windings of coils from a rotor body of an electrical generator like that depicted in FIG. 1 via electrical brushes that are maintained continuously on a surface of collector rings of the generator like that depicted in FIG. 2 according to the prior art;

FIG. 4 shows a schematic representation of an electrical circuit illustrating the passing of an electrical current between an external source and multiple field windings of coils from an electrical generator with an arrangement of switches electrically connected to the electrical brushes according to an embodiment of the invention;

FIG. 5 shows a schematic representation of an electrical circuit illustrating the passing of an electrical current between an external source and multiple field windings of coils from an electrical generator having an arrangement of switches with some switches placed in series with a respective electrical brush and other switches operatively coupled to a pair of electrical brushes according to an embodiment of the invention;

FIG. 6 shows a schematic representation of an electrical circuit illustrating the passing of an electrical current between an external source and multiple field windings of coils from an electrical generator with an arrangement of switches with some switches placed in series with a respective electrical brush and other switches operatively coupled to a group of electrical brushes according to an embodiment of the invention;

FIG. 7 shows a schematic representation of the electrical circuit depicted in FIG. 4 with a collector brush monitoring system to monitor the electrical brushes according to an embodiment of the invention;

FIG. 8 shows a schematic representation of an electrical circuit illustrating the passing of an electrical current between an external source and multiple field windings of coils from an electrical generator with an arrangement of resistor devices that can include fixed resistors operatively coupled with an arrangement of switches and the electrical brushes according to an embodiment of the invention; and FIG. 9 shows a schematic representation of an electrical circuit illustrating the passing of an electrical current between an external source and multiple field windings of coils from an electrical generator with an arrangement of resistor devices that can include power electronic devices operatively coupled with an arrangement of switches and the electrical brushes according to an embodiment of the invention.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to dynamoelectric machines, and more specifically, to deploying an arrangement of a switches in electrical connection with electrical brushes that are maintained on a surface of a collector ring placed on a rotating shaft of a dynamoelectric machine that pass current between an external source and the dynamoelectric machine, and selectively activating and deactivating the brushes during the operation of the dynamoelectric machine via the switches for a predetermined time period to adjust an average current density of the current passing through the brushes to be within a predetermined current density range.

Although the various embodiments are described with respect to an electrical generator, it is understood that these embodiments have applicability with other types of dynamoelectric machines that utilize collector rings and electrical brushes that can ride on the rings during the operation of the machines. Examples of other dynamoelectric machines that the various embodiments may have applicability include, but are not limited to, electric motors and alternators.

Turning now to the figures, FIG. 1 shows an isometric view of an electrical generator 10 according to the prior art. As shown in FIG. 1, the electrical generator 10 includes a rotor body 12 that can be made of a ferrous metal material that is rotatably mounted on a shaft 14 via a bearing assembly (not illustrated). Arranged circumferentially about the mid-section of the rotor body 12 are a multiple of axially oriented slots 16 extending radially outward from a center of the rotor body. The slots are used for holding a multiple of field windings of coils 18 that can be made of copper or aluminum. These multiple of field windings of coils can include longitudinally oriented central windings 20 secured within the slots 16, and turns of endwindings 22 extending out from the slots 16 at axial ends 24 of the rotor body 12.

The shaft 14 of the electrical generator 10 can include a driven end 26 having a coupling 28 for a prime mover such as a gas turbine or a steam turbine that is operative to turn the shaft. The turning of the shaft by the prime mover produces a rotating magnetic field within the machine. This induces a three-phase set of voltages with stator windings in a stator of the electrical generator 10 that encloses the rotor body 12. Both the stator and stator windings are not illustrated for purposes of clarity. The opposing end of the shaft 14, which can be referred to as the non-driven end 30, includes collector rings 32, such as for example slip rings, mounted on or attached to the shaft that rotate with shaft as the shaft rotates, and a coupling 34 which can be used to couple a generator excitation system in one embodiment or a gear reduction unit in another embodiment. Stationary electrical brushes (not illustrated in FIG. 1) that can be spring loaded are maintained continuously on a surface of the collector rings 32 as the rings rotate with the shaft 14. Electrical current from an external source such as a generator excitation system can be supplied to the collector rings 32 via the electrical brushes. The electrical current passes from the collector rings 32 passes internally through the shaft 14 to the field windings 18 in the rotor body 12. In this manner, the electrical current that passes from the electrical brushes to the collector rings 32 to the field windings 18 can maintain the rotating electromagnetic field at a fixed polarity.

FIG. 2 illustrates a partial perspective view of a single brush holder rigging assembly 36 installed on a brush mount or a collector horseshoe 38 installed on a collector ring 32 of an electrical generator like that depicted in FIG. 1 according to the prior art. Although not shown in FIG. 2, the collector ring 32 rotates along with the shaft and the rotor body of the electrical generator. For clarity, FIG. 2 only shows one brush holder rigging assembly 36, but it is understood that more rigging assemblies can be mounted on the collector horseshoe 38 and distributed at least partially around the collector ring 32. Each brush holder rigging assembly 36 can include one or more electrical brushes 40 and a corresponding brush holder 42 for the brush(es) and a stationary support member 44. For example, FIG. 2 shows that the brush holder rigging assembly 36 can include a pair of electrical brushes 40 in the brush holder 42. The electrical brushes 40 are typically a block of graphitelike carbon compound that can conduct electricity freely and has generally very low friction so that it does not wear down the collector ring 32. The brush holder 42 retains the brush(es) contained therein at least in the axial and circumferential directions. In one embodiment, the brush holder 42 can use a brush spring that radially biases the electrical brush(es) in a downward direction to maintain contact with a surface of the collector ring 32. The stationary support member 44 is configured for electrical connection to the collector horseshoe 38. To this extent, the stationary support member 44 can be fabricated of a conductive material or include a conductive material, as well as have the electrical wiring for carrying the electrical current to or from the brush(es). The brush holder rigging assembly 36 may be bolted or screwed to the collector horseshoe 38, however it is understood that other methods of fastening, attaching or the like may be utilized. Details of the brush holder rigging assembly 36 are well-known, and are disclosed for example in the U.S. Pat. No. 10,158,206, of which the content of its disclosure is incorporated herein by reference.

It is understood that the foregoing description of the brush holder rigging assembly 36 is representative of only one configuration that can be used to maintain electrical brushes continuously on a surface of a collector ring 32 as the ring rotates with the shaft 14 while being operative to pass electrical current between the field windings 18 in the rotor body 12 of the electrical generator 10 and a generator excitation system, and is not meant to limit the scope of the various embodiments. Those skilled in the art will appreciate that the embodiments described herein can be implemented with other types of brush holder rigging assemblies.

FIG. 3 shows a schematic representation of an electrical circuit 46 illustrating the passing of an electrical current between an external source such as a generator excitation system 48 and multiple field windings of coils 18 from the rotor body 12 of the electrical generator 10 depicted in FIG. 1 via electrical brushes 40 that are maintained continuously on a surface of a collector ring 32 of the generator like that depicted in FIG. 2 according to the prior art. As shown in FIG. 3, the generator excitation system 48, which can be a power source, such as for example, a direct current (DC) source, supplies DC power to the brushes via electrical wiring 50 in the form of electrical current. The electrical brushes 40 pass the electrical current to the collector rings 32 which supply the current to the field windings of coils 18. As shown in this figure, one ring 32 with electrical brushes 40 operatively coupled to the ring, is connected to the positive terminal of the generator excitation system 48, while the other ring 32 with brushes 40 is connected to the negative terminal of the generator excitation system 48. With this configuration, not only can electrical current pass from the electrical brushes 40 and the collector rings 32 to the field windings of coils 18, but the electrical current can also pass from the field windings of coils 18 to the generator excitation system 48 via the collector rings 32 and the electrical brushes 40.

The schematic of FIG. 3, as well the schematics of the other figures disclosed herein, only shows four electrical brushes 40 per collector ring 32 that are configured to supply the rings with electrical current via corresponding parallel paths. However, it is understood that there could be substantially more brushes that are operatively coupled to the collector rings. For example, there could be 20 to 40 parallel paths of electrical brushes per collector ring 32.

In this configuration of FIG. 3, there can be too many electrical brushes 40 to maintain an optimal average current density. This results in poor film development and can have a tendency to supply the electrical current unevenly to the collector rings 32. This leads to the aforementioned selectivity issues with certain electrical brushes 40. That is, those brushes will receive too much current, which leads to an accelerated wear rate due to excess current and heat that arises because of the current. As an example, when selectivity issues arise with the electrical brushes, it is possible to have some brushes receiving 100 amperes (A) while other brushes receiving 2 A.

The various embodiments described herein provide a switching arrangement between the generator excitation system 48 and the electrical brushes 40 that can be implemented in the brush holder rigging assemblies (e.g., in the stationary support member or other component within the brush holder rigging assembly that contains the electrical wiring) and used to activate or deactivate one or more of a single electrical brush, a pair of brushes, and a group of brushes for a predetermined time period in order to adjust the average current density of the current passing through the active brushes to be within a predetermined current density range. This is in contrast to the configuration depicted in FIG. 3 in which the electrical brushes are hard-wired with the generator excitation system 48 to always be in the circuit 46. With the switching arrangement, the various embodiments can ensure that on average each of the electrical brushes that are active are within a specific current density range that is representative of the brushes' optimal current density. As used herein, an electrical brush's optimal current density means that the brush operates in a range of, for example 40 A/in$^2$ to 65 A/in$^2$.

As a result of this switching arrangement, each of the various embodiments can ensure that the electrical brushes 40 can maintain an optimal average current density which promotes good film development and helps evenly distribute the electrical current between all of the brushes while the electrical generator is operating. As used herein, evenly distributing or supplying the electrical current between all of the electrical brushes while the electrical generator is operating means that the brushes share approximately the same current (e.g., all values within 10%) versus unequal sharing (e.g., where some brushes carry no currents while others carry currents up to twice the average or higher). To this extent, the selective activation and deactivation of the switches can keep the electrical brushes from becoming too hot, and thus preventing the brushes from getting more current and even hotter to the point that the increased current flow and heating causes the brushes to wear at an accelerated rate.

FIG. 4 shows a schematic representation of an electrical circuit 52 illustrating the passing of the electrical current between the generator excitation system 48 and the multiple field windings of coils 18 with an arrangement 54 of switches 56 electrically connected to the electrical brushes 40 and the excitation system according to an embodiment of the invention. In the embodiment depicted in FIG. 4, the arrangement 54 of switches 56 includes a switch electrically connected between each electrical brush and the generator excitation system 48. With a switch 56 placed in each leg of the circuit 52 between the generator excitation system 48 and one of the electrical brushes 40, the electrical current that is supplied to each brush can be individually controlled via the use of the switch. To this extent, the electrical brushes can be selectively activated and deactivated during the operation of the electrical generator. In one embodiment, the activation and deactivation of the electrical brushes 40 entails opening and closing the switches for a predetermined time period to adjust the average current density of the current passing through the brushes to be within a predetermined current density range.

It has been determined by the inventors to this disclosure that the activation and deactivation of the electrical brushes 40 is not a mere matter of opening and closing the switches 56. When a switch 56 to an electric brush is open like that shown in the top two legs of the circuit 52 for both rings 32, no current will flow to the corresponding brushes. When an electrical brush has no current flowing to it, a glaze can start to form at its interface with the collector ring 32 and be an issue as it builds up. For example, this build-up of glaze can inhibit the flow of the electrical current through the electrical brush 40 once its corresponding switch is moved from the open position to the closed position like that shown in the bottom two legs of the circuit 52 for both rings 32. In essence, the build-up of glaze forms a resistance to current flow and as a result, the electrical current cannot flow to the electrical brush despite its corresponding switch being closed.

A solution to this glazing issue that is provided by the various embodiments includes selectively activating and deactivating the switches 56 between the open position and the closed position so that the build-up of glazing does not occur. In one embodiment, the switches 56 can be selectively opened and closed for a predetermined time period. As used herein, a predetermined time period is an amount of time that is sufficient to prevent the build-up of a glaze on the brush interface. Those skilled in the art will appreciate that this amount of time that the switches are opened and closed can depend on the known time that it can take for the glaze to form. In general, this predetermined time period can range from seconds or portions of seconds to hours or even days. To this extent, selective ones of the switches 56 in the arrangement 54 can be periodically opened for the predetermined time, and then closed. After closing that switch, another switch 56 can then be opened for the predetermined time period, and then closed. This momentary opening and closing of the switches 56 can cycle through all of the switches in the arrangement. To this extent, the switches 56 in the arrangement 54 can be opened long enough so that a build-up of glazing does not occur on the interface of their corresponding brushes 40. Meanwhile, the switches that are closed allow its corresponding brushes 40 to maintain its operation at an optimal average current density level that is specified for the brushes. In this way, on average, the brushes are never carrying too much current or too little current. As a result, a good film can be formed and the electrical current can be evenly distributed among the electrical brushes 40 in the electrical circuit 52 of FIG. 4.

FIG. 5 shows a schematic representation of an electrical circuit 58 illustrating the passing of an electrical current between the generator excitation system 48 and the multiple field windings of coils 18 with an arrangement 60 of switches 56 where some switches are placed in series with a respective electrical brush 40 and other switches are operatively coupled to a pair of electrical brushes according to an embodiment of the invention. In the example depicted in FIG. 5, the circuit 58 shows that each collector ring 32 has at least one switch 56 that is configured to activate a pair of electrical brushes 40 that are operatively coupled with the rings. Although FIG. 5 shows that each collector ring 32 includes some switches 56 that are in series with a respective electrical brush, it is understood that the circuit 58 is representative of only one configuration and is not meant to be limiting. For example, each of the switches 56 in FIG. 5 can be operatively coupled to different pairs of electrical brushes.

Instead of having the switches 56 operatively coupled to different pairs of electrical brushes 40, the switches can be electrically connected to different groups of brushes for the collector rings. FIG. 6 shows an electrical circuit 62 with an arrangement 64 of switches 56 with some switches placed in series with a respective electrical brush 40 and other switches operatively coupled to a group of electrical brushes. In the example depicted in FIG. 6, the circuit 62 shows that each collector ring 32 has at least one switch 56 that is configured to activate a group of electrical brushes 40 (e.g., three brushes) that are operatively coupled with the rings. It is understood that a group of electrical brushes can include more than the three brushes depicted in the example of FIG. 6. In addition, FIG. 6, shows that each collector ring 32 includes at least one switch 56 that is in series with a respective electrical brush. The embodiment depicted in FIG. 6 is representative of only one configuration and is not meant to be limiting. For example, one switch 56 can be used with each of the collector rings 32 to activate and deactivate all of the electrical brushes that are operatively coupled to each of the rings. In another variation, there can be at least one switch to activate or deactivate one group of brushes 40 for at least one of the rings, and at least one switch 56 to activate or deactivate a pair of brushes. Further, it is understood that these variations can also include switches 56 that are configured to operate with one brush.

The arrangement of switches that are depicted with the various embodiments described herein that can be used to adjust the average current density of electrical brushes to be within a predetermined current density range specified for the brushes has utility in a variety of scenarios. For example, when the electrical generator is used during periods of low power demand, the switches can be selectively activated and deactivated for a predetermined time period to ensure that the brushes receive a supply of current that is within a predetermined average current density range that is representative of an optimal current density range for the brushes. For example, consider a scenario in which there are 100 electrical brushes that operate in conjunction with the collector rings, but only 90 are needed to get an optimal average current density. The switches of the various embodiments can be used to selectively activate and deactivate the 90 electrical brushes to ensure that average current density to these brushes is correct. Presumably, if the average current density to these brushes is correct, then the current should share more equally among the brushes, which will preclude selectivity issues from arising.

The predetermined time period that electrical switches are selectively closed and opened can dictate the speed at which at the brushes are activated and deactivated. Other factors that can have a role in the time period and how the switches are opened and closed can include the amount of current supplied by the generator excitation system, the optimal current density of the brushes, the number of brushes coupled to the collector rings, and the number of brushes that are needed to be active to handle the current supplied by the excitation system. In any event, the switches can be selectively activated and deactivated in a manner that leads to the current being distributed among all of the brushes such that glazing is avoided on the brushes' interfaces with the collector rings. Once the electrical generator begins to operate in periods where there is high power demand, then the switches can be maintained in a closed position.

Further, it is understood that the various embodiments can be implemented in one of a number of different scenarios. In one embodiment, the switches can be switched on and off according to the level of exciter current supplied.

In another embodiment, the use of the arrangement of switches to selectively activate and deactivate electrical brushes can be used as part of a collector brush monitoring system. For example, collector brush monitoring systems that have the capability to monitor the wear and temperature of the brushes, as well as the amount of current supplied to the brushes, can be configured to actively manage the operation of the switches to selectively supply electrical current to the brushes. For example, if there are problems noted with any particular electrical brush, then the switch that controls the power to the brush can be opened so that it is turned off. Overall, implementing the various embodiments with a brush monitoring system can be used to make a more robust monitoring system as it can perform additional functionality that includes to ensure that the current from the generator excitation system is evenly distributed among the brushes.

FIG. 7 shows a schematic representation of one of the switching arrangements disclosed herein with a collector brush monitoring system 66 to monitor the electrical brushes. In particular, FIG. 7 shows a schematic representation of an electrical circuit 68 that corresponds with the circuit depicted in FIG. 4, but the electrical circuit 68 of FIG. 7 includes the collector brush monitoring system 66. In operation, the collector brush monitoring system 66 can monitor the wear and temperature of the brushes 40, the amount of current supplied to the brushes vias current sensors (e.g., current transformers) disposed about the switches 56 and the brushes 40. The current sensors are not depicted in FIG. 7 for purposes of clarity, however those skilled in the art will appreciate that the sensors can be located in a variety of locations that include before and/or after the switches 56. Furthermore, it is understood that the use of the collector brush monitoring system 66 to monitor the electrical brushes is not meant to be limited to this configuration. The collector brush monitoring system 66 is suitable for with any of the switching arrangements depicted in FIGS. 4-6, as well as any of the alternative switching arrangements that can be configured. Further, the collector brush monitoring system 66 is suitable for use with embodiments depicted in FIGS. 8 and 9 that employ resistor devices in the various legs between the generator excitation system 48 and the electrical brushes 40.

The capability of the various embodiments to evenly distribute electrical current to the electrical brushes can be further enhanced by using an arrangement of balance resistor devices operatively coupled with the switches and the brushes to control the current flow to each brush, pair of brushes or groups of brushes that are operatively coupled to the collector rings. For example, in one embodiment, the selective activation and deactivation of the switches can be used to control the average current density for a targeted number of electrical brushes, while the balance resistor devices can be used ensure that each brush receives a specified current flow. In one embodiment, the balance resistor devices can be used to drive the equal sharing of the electrical current among the brushes targeted to handle the average current density. In one embodiment, the balance resistor devices can be used control the current to each electrical brush such that each brush receives a specified amount of current.

FIG. 8 shows a schematic representation of an electrical circuit 70 with an arrangement 72 of fixed resistor 74 operatively coupled with an arrangement 76 of switches 56 and the electrical brushes 40 according to an embodiment of the invention. In one embodiment, the resistors 74 are configured to remove variable resistance between the generator excitation system 48 and the electrical brushes 40, ensuring that each brush receives a specified current flow. When the arrangement 76 of switches 56 are selectively activated and deactivated for a predetermined time period to adjust the average current density of the electrical current passing through the electrical brushes 40 to be within a predetermined current density range as discussed above, there is a tendency for each brush to act in its own manner due to the innate variability that exists in each of the legs that electrically connects the brushes with the generator excitation system 48 and the variability that exists at the interface between the brushes and the collector rings 32. The addition of the fixed resistors 74 in each of the legs between the switches 56 and the electrical brushes 40 helps to overcome this variability. As long as the resistors 74 have a resistance that is greater than the resistance at the interface between the electrical brushes 40 and the collector rings 32, the resistors can drive how much current goes to each brush. In one embodiment, if the resistance of the resistors 74 is substantially larger to the resistance at the interface between the electrical brushes 40 and the collector rings 32, then the resistors can ensure that each of the brushes receive an equal amount of the current supplied from the generator excitation system 48. In one embodiment, the resistance of the resistors 74 can be designated with an amount that can drive a specified current through each of the electrical brushes 40. Setting the resistance of each of the resistors 74 to a designated amount to drive a specified current through the electrical brushes 40 is considered to be within the realm of those skilled in the art.

Instead of using fixed resistors as depicted in FIG. 8, variable resistors can be used in placed thereof, or in an arrangement that includes in combination with fixed resistors. For example, FIG. 9 shows a schematic representation of an electrical circuit 78 with an arrangement 80 of variable resistor devices 82 operatively coupled with an arrangement 84 of switches 56 and the electrical brushes 40 according to an embodiment of the invention. Like the arrangement 72 of fixed resistors 74 depicted in FIG. 8, the arrangement 80 of variable resistor devices 82 in FIG. 9 can be utilized to remove variable resistance between the generator excitation system 48 and the electrical brushes 40, ensuring that each brush receives a specified current flow. In one embodiment, each of the variable resistor devices 82 can be adjusted in a manner that ensures that each of the brushes receive an equal amount of the current supplied from the generator excitation system 48. In one embodiment, each of the variable resistor devices 82 can be adjusted to drive a specified current through each of the electrical brushes 40. The variable resistors can include any of a number of different types of variable resistors. A non-exhaustive list of possible variable resistors that are suitable for use with the various embodiments includes any type of power electronic resistive devices such as thyristors, for example, insulated-gate bipolar transistors (IGBTs), metal-oxide-semiconductor field-effect transistors (MOSFETs), and silicon-controlled rectifiers (SCRs).

It is understood that the arrangement 72 of fixed resistor devices 74 depicted in FIG. 8 and the arrangement 80 of variable resistors 82 depicted in FIG. 9 represent only a couple of configurations of using resistor devices to remove variability in the legs between the generator excitation system 48 and the electrical brushes 40 so a specified current can be supplied to each of the brushes. For example, instead of having individual resistor devices (e.g., fixed resistors, variable resistors) connected to different electrical brushes, the resistor devices can be coupled to groups of brushes. Also, instead of having one resistor device electrically connected to a group of electrical brushes, a sub-group of resistor devices can operate in conjunction with a main resistor device that is operatively coupled to the generator excitation system 48 to facilitate that a specified current is supplied to each of the brushes in the group.

Further details of using an arrangement of resistor devices to remove the variability of electrical resistance between the generator excitation system 48 and the electrical brushes 40 that can impact how the current is distributed among the brushes like that discussed with regard to FIGS. 8 and 9 is provided in U.S. patent application Ser. No. 18/493,929, entitled "SYSTEM AND METHOD FOR CONTROLLING CURRENT DISTRIBUTION TO ELECTRICAL BRUSHES USED IN DYNAMOELECTRIC MACHINE", of which the content of its disclosure is incorporated herein by reference.

From the description of the illustrated embodiments presented herein, it should be evident that the subject disclosure sets forth an effective solution for evenly distributing electrical current to electrical brushes that are operatively coupled to collector rings placed on a dynamoelectric machine such as an electrical generator, thereby improving performance of the machine. Further, operating the switches to selectively activate and deactivate electrical brushes during the operation of the electrical generator in a manner that keeps the average current passing through the brushes within a predetermined optimal average current density set for the brushes allows the embodiments to avoid glazing of the brushes. This capability is helpful in reducing selectivity issues that can arise as power plants continue to increase turndown which necessitates the plants to operate over a large range of field currents that is typically outside of the range of the brushes' current density requirements. Not only do the various embodiments provide the ability to optimize the electrical brushes over any field current range, but the embodiments can improve the reliability of the generator's collector system via the switching off of poorly operating brushes or groups of brushes by reducing selectivity.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc., if used, are merely labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property. Moreover, articles "a" and "an" as used in the subject specification and annexed drawings should generally be construed to mean "one or more" unless specified otherwise or clear from context to be directed to a singular form. In addition, the phrase "one or more of" used before a listing of a number of possible options or recitations is intended to mean any of the natural inclusive permutations. For example, "one or more of A and B" is satisfied by only A, only B, or both A and B.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A system, comprising: a collector ring placed on a rotating shaft of a dynamoelectric machine; a plurality of electrical brushes maintained on a surface of the collector ring as the collector ring rotates with the rotating shaft, wherein the plurality of electrical brushes are configured to pass electrical current between an external source and the dynamoelectric machine via the collector ring; and an arrangement of a plurality of switches electrically connected to the plurality of electrical brushes to selectively activate and deactivate the plurality of electrical brushes during the operation of the dynamoelectric machine, wherein selective ones of the plurality of switches are opened and closed for a predetermined time period to adjust the average current density of the electrical current passing through the electrical brushes to be within a predetermined current density range while the dynamoelectric machine is operating.

The system of the preceding clause, wherein the plurality of switches are configured to split the electrical current evenly between all of the plurality of electrical brushes.

The system of any of the preceding clauses, wherein each of the plurality of switches is electrically connected to a different one of the plurality of electrical brushes.

The system of any of the preceding clauses, wherein some of the plurality of switches are electrically connected to a different pair of brushes of the plurality of electrical brushes.

The system of any of the preceding clauses, wherein some of the plurality of switches are electrically connected to a different group of brushes of the plurality of electrical brushes.

The system of any of the preceding clauses, wherein the plurality of switches are configured to selectively activate and deactivate the plurality of electrical brushes while the dynamoelectric machine operates at low power.

The system of any of the preceding clauses, wherein the plurality of switches are maintained in a closed position while the dynamoelectric machine operates at high power.

The system of any of the preceding clauses, wherein the selective activation and deactivation of the plurality of electrical brushes by the plurality of switches is a function of an amount of the electrical current passing between the external source and the dynamoelectric machine, an optimal average current density requirement for the electrical brushes, and a number of the plurality of electrical brushes that are necessary to be active to handle the electrical current supplied by the external source. The system of any of the preceding clauses, further comprising an arrangement of a plurality of resistor devices operatively coupled with the arrangement of the plurality of switches and the plurality of electrical brushes, wherein the plurality of resistor devices are configured to remove variable resistance between the external source and the brushes, ensuring that each brush receives a specified current flow.

The system of any of the preceding clauses, wherein each of the plurality of resistor devices is operatively coupled to a different one of the plurality of electrical brushes.

The system of any of the preceding clauses, wherein the plurality of resistor devices comprise one or more of a fixed resistor and a variable resistor.

A dynamoelectric machine, comprising: a rotatable shaft; a rotor body mounted on the rotatable shaft, the rotor body having a plurality of field windings of coils secured thereabout; at least one collector ring placed on an end of the rotatable shaft; a plurality of electrical brushes maintained on a surface of the at least one collector ring as the at least one collector ring rotates with the rotatable shaft, wherein the plurality of electrical brushes are configured to pass electrical current between an external source and the field windings of coils secured to the rotor body via the at least one collector ring; and an arrangement of a plurality of switches electrically connected to the plurality of electrical brushes to selectively activate and deactivate the plurality of electrical brushes during the rotation of the rotor body, wherein selective ones of the plurality of switches are opened and closed for a predetermined time period to adjust an average current density of the electrical current passing through the electrical brushes to be within a predetermined current density range while the rotor body is rotating.

The dynamoelectric machine of the preceding clause, wherein the plurality of switches are configured to split the electrical current evenly between all of the plurality of electrical brushes.

The dynamoelectric machine of any of the preceding clauses, wherein each of the plurality of switches is electrically connected to a different one of the plurality of electrical brushes.

The dynamoelectric machine of any of the preceding clauses, wherein some of the plurality of switches are electrically connected to a different pair of brushes of the plurality of electrical brushes.

The dynamoelectric machine of any of the preceding clauses, wherein some of the plurality of switches are electrically connected to a different group of brushes of the plurality of electrical brushes.

The dynamoelectric machine of any of the preceding clauses, wherein the plurality of switches are configured to selectively activate and deactivate the plurality of electrical brushes while operating at low power, and wherein the plurality of switches are maintained in a closed position while operating at high power.

The dynamoelectric machine of any of the preceding clauses, further comprising an arrangement of a plurality of resistor devices operatively coupled with the arrangement of the plurality of switches and the plurality of electrical brushes, wherein the plurality of resistor devices are configured to remove variable resistance between the external source and the brushes, ensuring that each brush receives a specified current flow.

A method for optimizing current density to a plurality of electrical brushes maintained on a surface of a collector ring placed on a rotating shaft of a dynamoelectric machine that pass electrical current between an external source and the dynamoelectric machine, the method comprising: arranging a plurality of switches in electrical connection with the plurality of electrical brushes; and selectively activating and deactivating the plurality of electrical brushes during the operation of the dynamoelectric machine via the plurality of switches, wherein selective ones of the plurality of switches are opened and closed for a predetermined time period to adjust an average current density of the electrical current passing through the electrical brushes to be within a predetermined current density range while the dynamoelectric machine is operating.

What is claimed is:

1. A system, comprising:
   a collector ring placed on a rotating shaft of a dynamoelectric machine;
   a plurality of electrical brushes maintained on a surface of the collector ring as the collector ring rotates with the rotating shaft, wherein the plurality of electrical brushes are configured to pass electrical current between an external source and the dynamoelectric machine via the collector ring; and
   an arrangement of a plurality of switches electrically connected to the plurality of electrical brushes to selectively activate and deactivate the plurality of electrical brushes during the operation of the dynamoelectric machine, wherein selective ones of the plurality of switches are opened and closed for a predetermined time period to adjust the average current density of the electrical current passing through the electrical brushes to be within a predetermined current density range while the dynamoelectric machine is operating.

2. The system according to claim 1, wherein the plurality of switches are configured to split the electrical current evenly between all of the plurality of electrical brushes.

3. The system according to claim 1, wherein each of the plurality of switches is electrically connected to a different one of the plurality of electrical brushes.

4. The system according to claim 1, wherein some of the plurality of switches are electrically connected to a different pair of brushes of the plurality of electrical brushes.

5. The system according to claim 1, wherein some of the plurality of switches are electrically connected to a different group of brushes of the plurality of electrical brushes.

6. The system according to claim 1, wherein the plurality of switches are configured to selectively activate and deactivate the plurality of electrical brushes while the dynamoelectric machine operates at low power.

7. The system according to claim 1, wherein the plurality of switches are maintained in a closed position while the dynamoelectric machine operates at high power.

8. The system according to claim 1, wherein the selective activation and deactivation of the plurality of electrical brushes by the plurality of switches is a function of an amount of the electrical current passing between the external source and the dynamoelectric machine, an optimal average current density requirement for the electrical brushes, and a number of the plurality of electrical brushes that are necessary to be active to handle the electrical current supplied by the external source.

9. The system according to claim 1, further comprising an arrangement of a plurality of resistor devices operatively coupled with the arrangement of the plurality of switches and the plurality of electrical brushes, wherein the plurality of resistor devices are configured to remove variable resistance between the external source and the brushes, ensuring that each brush receives a specified current flow.

10. The system according to claim 9, wherein each of the plurality of resistor devices is operatively coupled to a different one of the plurality of electrical brushes.

11. The system according to claim 9, wherein the plurality of resistor devices comprise one or more of a fixed resistor and a variable resistor.

12. A dynamoelectric machine, comprising:
    a rotatable shaft;
    a rotor body mounted on the rotatable shaft, the rotor body having a plurality of field windings of coils secured thereabout;
    at least one collector ring placed on an end of the rotatable shaft;
    a plurality of electrical brushes maintained on a surface of the at least one collector ring as the at least one collector ring rotates with the rotatable shaft, wherein the plurality of electrical brushes are configured to pass electrical current between an external source and the field windings of coils secured to the rotor body via the at least one collector ring; and
    an arrangement of a plurality of switches electrically connected to the plurality of electrical brushes to selectively activate and deactivate the plurality of electrical brushes during the rotation of the rotor body, wherein selective ones of the plurality of switches are opened and closed for a predetermined time period to adjust an average current density of the electrical current passing through the electrical brushes to be within a predetermined current density range while the rotor body is rotating.

13. The dynamoelectric machine according to claim 12, wherein the plurality of switches are configured to split the electrical current evenly between all of the plurality of electrical brushes.

14. The dynamoelectric machine according to claim 12, wherein each of the plurality of switches is electrically connected to a different one of the plurality of electrical brushes.

15. The dynamoelectric machine according to claim 12, wherein some of the plurality of switches are electrically connected to a different pair of brushes of the plurality of electrical brushes.

16. The dynamoelectric machine according to claim 12, wherein some of the plurality of switches are electrically connected to a different group of brushes of the plurality of electrical brushes.

17. The dynamoelectric machine according to claim 12, wherein the plurality of switches are configured to selectively activate and deactivate the plurality of electrical brushes while operating at low power, and wherein the plurality of switches are maintained in a closed position while operating at high power.

18. The dynamoelectric machine according to claim 12, further comprising an arrangement of a plurality of resistor devices operatively coupled with the arrangement of the plurality of switches and the plurality of electrical brushes, wherein the plurality of resistor devices are configured to remove variable resistance between the external source and the brushes, ensuring that each brush receives a specified current flow.

19. A method for optimizing current density to a plurality of electrical brushes maintained on a surface of a collector ring placed on a rotating shaft of a dynamoelectric machine that pass electrical current between an external source and the dynamoelectric machine, the method comprising:
  arranging a plurality of switches in electrical connection with the plurality of electrical brushes; and
  selectively activating and deactivating the plurality of electrical brushes during the operation of the dynamoelectric machine via the plurality of switches, wherein selective ones of the plurality of switches are opened and closed for a predetermined time period to adjust an average current density of the electrical current passing through the electrical brushes to be within a predetermined current density range while the dynamoelectric machine is operating.

20. The method of claim 19, further comprising arranging a plurality of resistor devices for operative coupling with the plurality of switches and the plurality of electrical brushes, wherein the plurality of resistor devices are configured to remove variable resistance between the external source and the brushes, ensuring that each brush receives a specified current flow.

* * * * *